July 6, 1965  K. H. PITZER  3,192,820
QUICK RELEASE PIN

Filed Jan. 16, 1961  2 Sheets-Sheet 1

INVENTOR.
KENNETH H. PITZER
BY
ATTORNEY

July 6, 1965  K. H. PITZER  3,192,820
QUICK RELEASE PIN
Filed Jan. 16, 1961  2 Sheets-Sheet 2
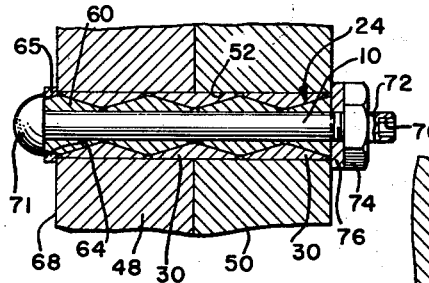
FIG. 5.
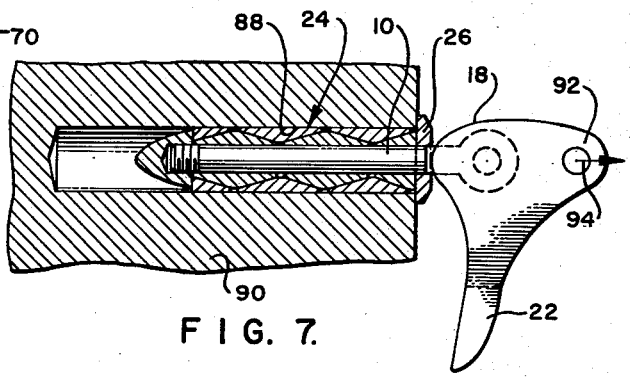
FIG. 7.
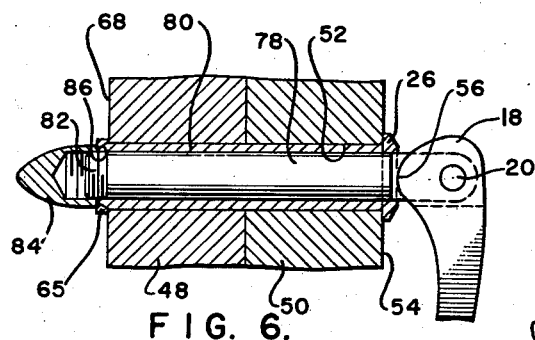
FIG. 6.
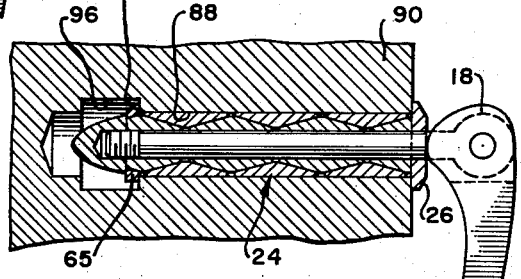
FIG. 8.
FIG. 9.
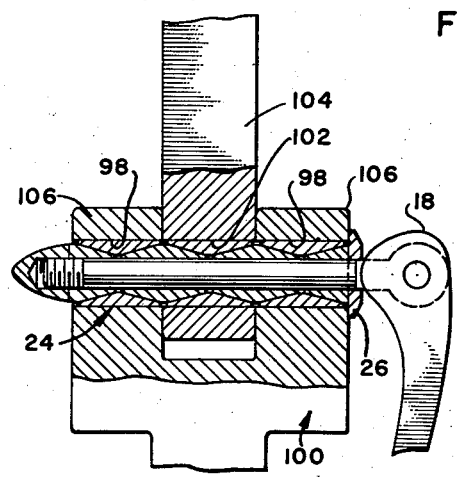
FIG. 10.
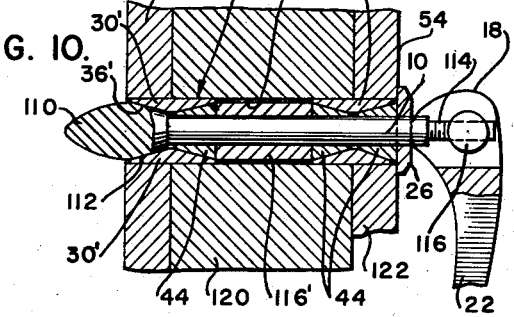
INVENTOR.
KENNETH H. PITZER
BY
ATTORNEY : 3,192,820
QUICK RELEASE PIN
Kenneth H. Pitzer, Los Angeles, Calif., assignor of two-thirds to Paul Gross, Tarzana, Calif.
Filed Jan. 16, 1961, Ser. No. 82,944
7 Claims. (Cl. 85—69)

This application is a continuation-in-part of my copending application Serial No. 624,132 filed November 23, 1956, now Patent No. 3,009,747 granted November 21, 1961.

This invention relates to a novel quick release or anchor pin especially suitable for use in securing structural steel, machinery, and the like, to concrete or masonry walls, floors, abutments, and the like, such anchor pin being particularly adapted for use in blind holes.

Conventional quick release pins, e.g., of the ball lock type, have a serious disadvantage in many applications. In order for the conventional quick relase pins to be installed with any degree of facility, it is necessary that there be appreciable clearance between pin and hole; that is, the inside diameter of the hole must be of a larger diameter than the outside diameter of the shank of the pin by a significant amount. This clearance is a serious disadvantage when the pin is used in applications where the unit is subjected to serious shaking, vibration, sudden load reversal, shock loads and like conditions. Such rigorous treatment soon damages the pin, and tends to wear out, elongate, or otherwise produce deterioration of the holes in which the pins are installed.

One object of this invention is to provide a quick release pin which fits radially tightly into the hole in which it is placed when locked in position therein.

Another object is to provide a quick release locking pin which can be readily inserted into a hole, but after installation therein, is held tightly within the hole.

A still further object of the invention is the provision of a quick release pin which has sufficient clearance to be inserted readily into a hole but when installed therein is held tightly within the hole by contact between my pin device and the wall of the hole, and if desired, by an additional clamping action between one end of my device and the adjacent wall of the part.

Yet another object is the provision of a quick release locking pin having the above characteristics, and which is simple in construction, easily manufactured, and is of relatively low cost.

Other objects and advantages will appear hereinafter.

I have found that the above objects can be achieved by providing means for increasing the effective diameter of the pin after installation in the hole, so that the pin is held in tight engagement with the wall of the hole in operative position, and for reducing the effective diameter of the pin prior to removal, so that the pin again has sufficient clearance to be removed easily from the hole. This change in effective diameter of the pin is accomplished preferably by mounting a radially expansible or adjustable wall thickness bushing about the shank of the pin, and expanding the bushing when the pin is in the hole by means attached to one end of the pin, e.g., a cam means, for applying a compressive force to compress the bushing. The other end of the pin carries a head having a diameter not greater than the outside diameter of the bushing in expanded position in a hole, and preferably about equal to the outside diameter of the bushing in relaxed position, so that the pin, including such head, can be inserted in the hole prior to expansion of the bushing. However, the outside diameter of the head also can be smaller than the outside diameter of the bushing in relaxed position. The head abuts one end of the bushing and a thrust member or plate abuts the other end of the bushing. The thrust plate serves to transmit thrust produced by a compression applying member engaging such plate, to the bushing, as described more fully below. The bushing is compressed between the thrust member and head when the aforementioned compression applying means, e.g., a cam means, is actuated. Preferably the head is threaded onto the end of the pin to provide an additional adjusting means, although the head can be formed integral with the pin.

The radially expansible bushing is preferably of the type shown and described in my aforesaid copending application Serial No. 624,132, filed November 23, 1956, and the disclosure of said copending application is incorporated herein by reference. The bushing disclosed in my copending application comprises male and female split ring elements which are formed so as to have mating wedge surfaces and are positioned about the pin. The male element may be elastically and radially contracted, and the female element may be elastically and radially expanded by application of an axial thrust thereon, and may be returned elastically to their original diameter and form when the thrust is relieved. One or more pairs of such split rings can be employed, consisting of overlying female and underlying male wedge rings whose contiguous surfaces form an acute angle with the axis of the rings so that a longitudinal compressive force causes radial contraction of the male ring elements and radial expansion of the female ring elements. The ends of the bushing assembly are usually formed by half segments, as they provide a perpendicular surface against which the adjusting force may be applied. If desired, non-expansible spacers can be positioned between the expansible rings.

According to another feature of the invention, I can also incorporate means in my quick release locking pin to provide a positive clamping action of the pin when placed in position in the hole, so as to positively retain the pin in tight locked position. This can be accomplished by providing an inclined outer surface at one end of the bushing adjacent the head, and placing an expansible ring about such surface, said ring having a contiguous surface mating with said inclined surface. When the bushing is axially compressed to expand it into engagement with the hole, as above described, such compression will cause the above noted expansible ring to slide up the inclined surface until it makes contact with the side wall about the periphery of the hole, of the structure in which the pin is inserted. When the compressive force is removed, the ring slides down the inclined surface to a position where the outer diameter of the ring is smaller than the diameter of the hole, so that the unit can be removed readily from the hole. Such expansible ring can be in the form of a half female segment of the female ring elements employed in the bushing, and the inclined surface on which such segment rides can be a wedge surface of one of the male elements of the expansible bushing, or an inclined surface formed separate from the expansible rings. This feature may be employed separately, e.g., to form a "blind bolt" which is readily removable and reusable, or in conjunction with the radially expansible bushing to provide both a tight and positive locking action when the pin is inserted in the hole.

By means of my quick release locking pin, two or more parts can be held securely in tight contact with each other, or by securing the pin in position in a blind hole the pin can be used as a rigid connection between the part in which the pin is inserted and another part.

The invention will be more clearly understood from the description below of various embodiments of my invention when taken in connection with the accompanying drawings wherein:

FIG. 5 is a section through another modified form of quick release pin according to the invention;

FIG. 6 is a section through still another modified form of quick release pin;

FIG. 7 is a section through still another modification of the quick release pin in position in a blind hole;

FIG. 8 is a view through a quick release pin of the type shown in FIG. 3, but employed in a blind hole containing a recess;

FIG. 9 shows a section through a quick release pin similar to that of FIG. 1, but employed to connect together a fork and a link or a clevis; and FIG. 10 is a section through still another modified form of my novel pin.

Figure 1A:
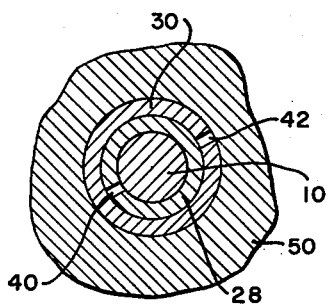
FIG. 1a is a section taken on line 1a—1a of FIG. 1.
Figure 1:
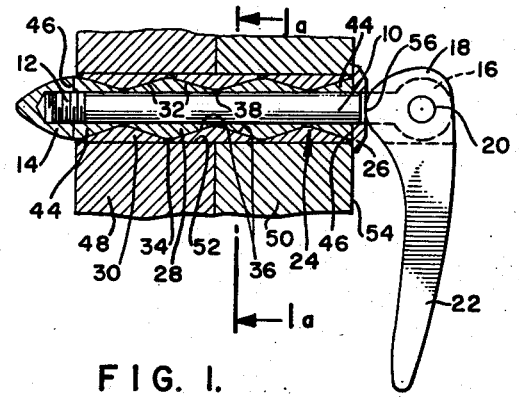
FIG. 1 is a longitudinal section through my quick release pin in expanded position in a hole formed in two parts which are to be connected together.
Figure 2:
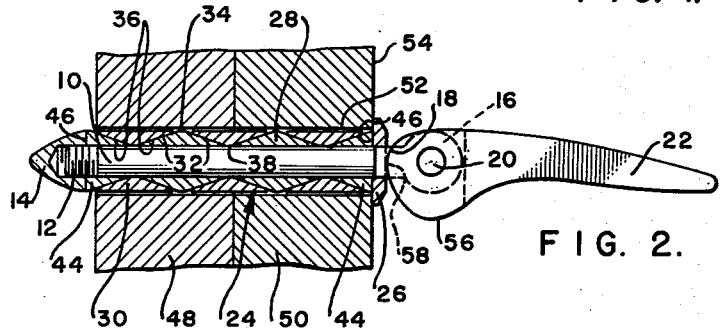
FIG. 2 is a view similar to FIG. 1, but showing the quick release pin in the hole prior to expansion of the radially expansible bushing.

Referring particularly to FIGS. 1, 1a and 2 of the drawing, the quick release pin of the invention comprises a draw pin 10 which is threaded at one end 12 into a head 14, and the opposite end of the pin shank 10 is formed into a ring 16. A cam member 18 is pivotally mounted on the draw pin 10 by means of a pivot pin 20 positioned within ring 16, the cam member 18 having a lever or handle 22 to permit manual rotation of the cam member.

A radially expansible bushing 24 is positioned about the pin 10, between the head 14 and a thrust plate or washer 26 which is slidably positioned on the draw pin adjacent to the ring 16 on the pin. Bushing 24 is composed of a series of interior male rings 28 positioned between female outer rings 30. The male rings have opposed exterior conical wedge surfaces 32 forming an obtuse angle with each other, and an intermediate exterior cylindrical surface 34 and an interior cylindrical surface. The female rings 30 mate with the male rings at opposite ends thereof, said female rings having an exterior cylindrical surface and interior opposed conical wedge surfaces 36 and an intermediate cylindrical surface 38, the surfaces 36 of the female rings also making an obtuse angle with each other substantially equal to the obtuse angle made by the wedge surfaces 32 of the male rings 28. The male rings 28 are split by a slot 40 extending through one wall of each ring and the female rings 30 are similarly provided with a slot 42 extending through one wall of each ring, the slots 40 and 42 of the rings 28 and 30 extending longitudinally of the axis of the rings. The ends of the bushing 24 are formed by half segments 44 of the male rings 28 to provide flat end surfaces 46. If desired, however, the ends of the bushing can be formed by half segments of female rings, or one end of the bushing can be formed by a half segment of a male ring and the other end by a half segment of a female ring. All of the rings are freely, angularly, longitudinally and radially positioned on the pin 10.

It will be seen that the inner surface of the head 14 and the inner surface of the thrust washer 26 at opposite ends of the draw pin 10 abut the adjacent flat surfaces 46 of the half segments 44. When bushing 10 is compressed as a result of a compressive force applied against thrust plate 26 in the manner described below, to thus shorten the overall length of the bushing, the male rings 28 contract and the female rings 30 are forced to expand and assume a larger diameter, forming a larger outside diameter on the bushing assembly. For reasons which will be made apparent below, the diameter of head 14 at its position of contact with the flat surface 46 of the adjacent half segment 44, has a diameter which is not larger than the diameter of the bushing or of the female rings 30 of the bushing in radially expanded position in a hole, and preferably about equal to the diameter of the bushing in relaxed position, as seen in FIG. 2, and the thrust washer 26 at the opposite end of the bushing has an outside diameter which is larger than the expanded diameter of the bushing or of the female rings 30 thereof in radially expanded position in a hole.

In use of the quick release pin described above and illustrated in FIGS. 1 and 2, for securely holding together two parts indicated at 48 and 50, the pin assembly is inserted in a hole 52 formed through the two parts 48 and 50. The outer diameter of the bushing 24 in the unexpanded or relaxed position thereof as shown in FIG. 2 is sufficiently smaller than the inside diameter of the hole 52 to permit the pin and bushing assembly to be readily inserted into the hole as seen in FIG. 2, even though the holes in parts 48 and 50 are not perfectly aligned with each other, or are slightly askew to one another, or a combination thereof. Since the diameter of head 14 on the assembly is about equal to the diameter of the bushing in the relaxed position and hence smaller than the diameter of the hole 52, the head 14 is readily inserted through the hole 52 for positioning of the pin as illustrated in FIG. 2.

When the pin and bushing assembly is positioned in hole 52 in the proper location and the thrust washer 26 abuts the outer surface 54 of the adjacent part 50, the cam member 18 is rotated clockwise from the position shown in FIG. 2 to its position shown in FIG. 1. During this clockwise rotation of the cam member 18, the high portion 56 of the cam member makes contact with the outer surface 58 of the thrust washer 26 and continued rotation of the cam member to the position shown in FIG. 1 exerts a pressure against the member 26. This shortens the effective length of pin 10 between members 14 and 26, and produces a compression of the bushing 24 between the head 14 and the thrust washer 26. This compression, as indicated above, causes the female rings 30 of the bushing to expand and produce a radially tight fit with the wall of the hole 52, thus holding the parts 48 and 50 in snug engagement. If it is desired to remove the pin and bushing assembly from hole 52 it is simply necessary to rotate the cam member 18 in a counterclockwise direction from the position shown in FIG. 1 to the position shown in FIG. 2, to release the compressive force on the bushing and to cause the female rings 30 of the bushing to contract away from the wall of the hole, and the male rings 28 to expand, thereby providing sufficient clearance to now quickly remove the pin and bushing assembly from the hole. The threaded engagement of the head 14 and the draw pin 10 permits an additional adjustment of the effective length of the pin between the head and washer 26. Such adjustment of the length of the pin permits a variation of the expanded outer diameter of the bushing. This feature is employed in order to obtain full engagement of the bushing in expanded position with the bore for variations in bore diameter. Such action can be further augmented, if desired, by incorporating springs (not shown) such as the so-called Belleville springs or equivalent means between the thrust washer 26 and the adjacent end 46 of the bushing, thus placing a further compressive load on the bushing and urging it into expanded position. These features aid in employing the pin device in varying size holes and in accommodating the expanded pin in holes which are not exactly in alignment.

Figure 3:
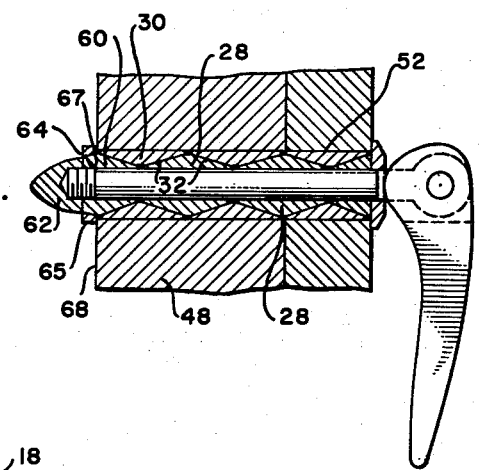
FIG. 3 is a device similar to that of FIG. 1, but showing my quick release pin modified to produce a clamping as well as a peripheral engagement with a structure.
Figure 4:
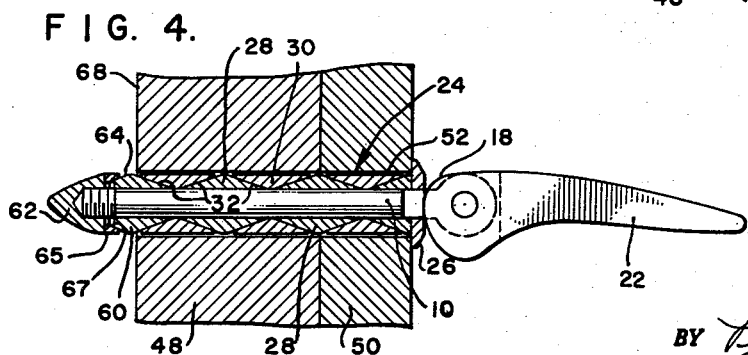
FIG. 4 is a view similar to FIG. 3, but showing the pin prior to expansion thereof.

Referring now to FIGS. 3 and 4 of the drawing, there is shown a modified form of device of the invention having a structure similar to that described above with respect to FIGS. 1 and 2, but wherein the male segment 60 adjacent the head 62 is somewhat more than one half of the male rings 28 of the bushing so as to provide in addition to one inclined surface 32 an oppositely inclined surface portion 64. An expansible ring 65 is positioned on the inclined surface portion 64 of the end segment 60, such ring having an interior inclined surface 67 mating with the inclined surface 64 of the segment 60. Preferably the expansible ring 65 is a segment of one of the female rings 30 of the bushing, such ring 65 having a slot therein as in the case of the female rings 30.

As seen in FIG. 4, in the relaxed position of the bushing, the ring 65 rests on the lower portion of the inclined surface 64 against the adjacent interior surface of the head 62. In this position of the ring 65, the diameter of such ring is smaller than the diameter of the hole 52 in which the assembly is positioned, and is substantially the same diameter as head 62 and the bushing 52 in its relaxed condition. This permits insertion of the assembly into the hole 52 as seen in FIG. 4, with substantial clearance and without interference by the ring 65. When the cam member 18 is rotated clockwise from its position in FIG. 4 to the position shown in FIG. 3 to exert tension on the pin 10 and a consequent compression of the bushing between members 62 and 26 this causes the ring 66 to climb the inclined surface 64 of end segment 60 until the ring 65 abuts the side wall 68 of part 48 around the periphery of hole 52, and also during such compression of the bushing 24, the female rings 30 of the bushing expand to a diameter such that their outside diameter positively engages the inside diameter or bore of hole 52, as previously described. This provides a positive clamping of the parts 48 and 50 between ring 65 and thrust washer 26, in addition to the force of attachment between the parts exerted by positive engagement of the bushing 24 against the surface of the hole 52 of the two parts. When it is desired to remove the pin and bushing assembly, the cam member 18 is rotated counterclockwise from the position of FIG. 3 to that in FIG. 4, causing the bushing 24 to retract from the side wall of the hole and the ring 65 to slide down surface 64 to the position shown in FIG. 4 against the head 62. Now the pin and bushing assembly can be removed easily from the hole 52.

The retaining ring 65 preferably has a smaller cross section than the male or female ring 28 or 30 and flexes more easily than 28 or 30. Thus, when the cam 18 applies a force to member 26, the more flexible ring 65 expands first into retaining position shown in FIG. 3, followed by expansion of the stiffer bushing 24 into engagement with the wall of hole 52.

Referring to FIG. 5, there is shown a modification of the quick release pin mechanism of FIGS. 3 and 4, and wherein the head 71 at one end is integral with the pin 10, and draw pin 10 is threaded adjacent its other end at 72 to receive a nut 74. The draw pin 10 contains a notch 70 in its outer end to receive a tool to hold pin 10 in nonrotatable position during rotation of nut 74, and a thrust washer 76 is provided between the nut 74 and the bushing 24. When the nut 74 is turned down against the washer 76 while the pin 10 is prevented from rotating, the pin 10 is shortened between 70 and 76, and the bushing 24 between members 70 and 76 is placed in compression to cause the clamping ring 65 to climb along the inclined surface 64 of segment 60 to its upper position against the wall 68 of the part 48, thus clamping the parts 48 and 50 together as shown in FIG. 5, and to cause the female rings 30 to expand into a tight fit with the wall of the hole 52, in a manner similar to that provided by the embodiment shown in FIG. 3. To remove the pin and bushing assembly from the hole 52 in the embodiment of FIG. 5, it is simply necessary to loosen the nut 74 while maintaining the pin 10 in non-rotatable position by insertion of a tool in notch 70, to thus permit the bushing 24 to return to its contracted position, and the ring 65 to slide down to its lower position as illustrated in FIG. 4, to provide sufficient clearance for removal of the pin and bushing assembly from the hole.

It will be seen that the use of nut 74 for applying a compressive force against thrust washer 76 has the advantage over the cam means 18 of FIGS. 1 to 4, of permitting adjustability of the length of the pin between the head and the thrust washer.

Referring now to FIG. 6, there is shown a modification comprising a pin 78 having mounted thereon a bushing or sleeve 80. The pin 78 is threadably engaged at one end 82 with a head 84 having a maximum diameter at its inner end not greater than the outside diameter of the sleeve 80. The pin 78 carries at its opposite end thrust member 26 and the cam member 18 is pivotally mounted at 20 for engagement with member 26. The sleeve 80 is provided at one end thereof adjacent the head 84 with an inclined surface 86 and the expansible ring 65 mates with the surface 86 of the sleeve 80. In this embodiment the sleeve 80 has an outside diameter which is just slightly smaller than the inside diameter of the hole 52 and the ring 65 in its contracted position has a diameter not greater than the outside diameter of the sleeve 80, and smaller than the diameter of said hole. Thus, in employing the pin and bushing assembly of FIG. 6, the assembly is slid through the hole 52 until the head 84 and the ring 65 are positioned externally of the hole, and the plate 26 is in abutting relation with the outside surface 54 of the part 50. Rotation of the cam member 18 to its position shown in FIG. 6 with the high portion 56 of the cam against plate 26 produces a tension on the pin 78 and a compressive force exerted by head 84 against the ring 65, causing it to slide up to its position shown in FIG. 6 into engagement with the side wall 68 of the part 48. Now the parts 48 and 50 are tightly clamped together between the ring 65 and the retainer member 26, and since sleeve 80 has about the same diameter as the hole 52 there is very little wabbling or displacement of the pin assembly within the hole when in the clamped position shown in FIG. 6. For removing this pin assembly it is simply necessary to rotate the cam member 18 from its position shown in FIG. 6 counterclockwise to release the tension on the pin 78 and permit the ring 65 to slide down the inclined surface 86 until it rests on pin 78 between head 84 and sleeve 80, thus assuming a diameter smaller than that of the hole 52, so that now the pin and sleeve assembly can be slid out from the hole 52.

In FIG. 7 there is shown the application of a pin and bushing quick release assembly similar to the structure shown in FIGS. 1 and 2 for attachment in a blind hole 88 of a part 90. In this embodiment ring 92 forms an integral part of the cam handle 22. It will be seen that when the quick release pin device is placed in position in the blind hole 88 and the handle 22 of cam member 18 is actuated to place the bushing 24 in tight engagement with the wall of the hole 88, the pin provides a means of connecting the part 90 with another member, not shown, via the ring 92. In one application of this embodiment, 92 can serve as a hoisting ring, and it will be seen that when a lifting force is applied to ring 92 in the direction indicated by arrow 94 part 90 can be raised without danger of cam 18 rotating counterclockwise, thus maintaining the high portion of cam 18 against the thrust washer 26 during such lifting motion, and preventing release of the expanded bushing from the bore wall. However, when the lifting load is released it will be seen that the cam 88 can be readily rotated counterclockwise to cause contraction of bushing 24 and permit easy removal of the pin from the bore.

Referring to FIG. 8 there is illustrated the application of the quick release pin device of the type shown in FIGS. 3 and 4, for use in a blind hole 88 of a part 90, such hole 88 containing circular groove 96 adapted to receive the clamping ring 65. When the pin and bushing assembly is inserted into the hole 88 of the part 90 as shown in FIG. 8, with the ring 65 adjacent the recess 96, the pin assembly can then be actuated by rotation of the cam member 18 to the position shown in FIG. 8 against thrust washer 26, to cause the ring 65 to expand into the recess 96 against an inner shoulder 97 of the part formed by such recess, and to produce expansion of the bushing 24 into tight engagement with the wall of the bore 88, thus providing both a positive attachment of the pin to the part 90 by means of the expanded bushing, as well as a retaining action provided by the ring 65. This embodiment can be modified by employing a cam member such as shown in FIG. 7 and carrying a hoisting ring, for use of the embodiment of FIG. 8 as a hoisting pin. Removal of the assembly of FIG. 8 from the hole 88 is readily brought about by counterclockwise rotation of the cam member 18 from its position in FIG. 8, to retract the ring 65 from the recess 96 and to retract the bushing 24 from the wall of the bore 88, so that sufficient clearance is now available for removal of the pin and bushing assembly from the hole 88.

In FIG. 9 there is shown another application of the embodiment of FIGS. 1 and 2. In this application the pin and bushing assembly are inserted through the aligned holes 98 of a fork 100 and through the hole 102 of a link 104 placed between the fork members 106. Thus, it is seen that when the cam member 18 is rotated into the position shown in FIG. 9 with the cam 18 pressed against thrust washer 26, the radially expansible bushing 24 is expanded into snug engagement with the walls of holes 98 of the fork members 106 and also with the wall of the hole 102 in the link 104. The pin assembly thus functions to maintain the link 104 in position in the fork, and these parts can be disconnected readily by rotating the cam member 18 of the pin and bushing assembly in FIG. 9 counterclockwise to retract the expansible bushing 24 from the walls of the holes 98 and 102 and provide sufficient clearance to readily remove the quick release pin assembly from the parts.

In FIG. 10 there is shown still another modified form of my device, wherein the head 110 forms an integral part of draw pin 10. Here the head 110 carries an inclined conical wedge surface 112 at its rear portion, which mates with a conical wedge surface 36' of the last female ring 30' of the bushing 24, which is adjacent head 110, and at its opposite end the draw pin 10 is threaded at 114 into an enlarged pivot pin 116 carrying the cam 18 for movement into and out of engagement with thrust washer 26. Also, instead of employing a bushing composed entirely of expansible rings, a rigid spacer in the form of a sleeve 116' is provided between expansible rings mounted on the end portions of pin 10, with female rings 30 and 30' positioned adjacent opposite ends of spacer 116', and half male segments 44 in cooperative relation with such female rings. Spacer 116' may have a diameter about equal to the diameter of the female rings in relaxed position. However, the diameter of 116' can be larger or smaller than the diameter of the female rings in relaxed position, but in any event smaller than the diameter of hole 52. It will be seen that when handle 22 is rotated clockwise to produce a compression of bushing 24 between head 110 and thrust washer 26, the wedge surface 36' of the end female ring 30' during expansion thereof, slides outwardly along the adjacent inclined surface 112 of the head 110, until the bushing has expanded into tight engagement with the wall of bore 52, to connect parts 120, 122 and 124. During subsequent relaxation of bushing 24 to its position shown in FIG. 10, the end female ring 30' slides inwardly along the inclined surface 112 of head 110. The spacer 116' reduces the number of expansible rings required.

It will accordingly be understood that the number of expansible rings on the bushing can be varied as desired, and one or more spacer members can be employed in conjunction with the expansible rings.

Although I have illustrated means connected to the pin, such as the cam 18 (FIG. 1) or the nut 74 (FIG. 5), for applying a force against a thrust washer 26, this member may be omitted, and the means for applying such force need not be connected to the pin, but may be an independent means such as an air cylinder of an independent mechanism. Further, if desired the thrust washer 26 can be omitted, e.g. in the embodiments of FIGS. 1 and 5, and the force applied directly to the adjacent end 46 of the bushing.

From the foregoing, it is seen that the invention provides a quick release pin which can be installed and removed readily from holes in which they are placed, which functions to provide a tight locking action between parts, and which fills the hole in which it is positioned so that there is substantially no clearance between the hole and the pin in the operative locked position of the pin, thus obviating any substantial movement and vibration of the pin in the hole when the unit is subjected to severe shaking or vibration, resulting in a more durable quick release device which does not cause deterioration of the holes in which the pins are installed. Such pins have a variety of applications. They can be employed as anchor pins, shear pins, clevis pins, indexing pins, and the like, and indeed for any application where a pin is required to be connected to a part through a hole therein, especially a blind hole, regardless of the function of the pin. The pin device of the invention is also especially useful for insertion in a hole from one side thereof, the other side of the hole being inaccessible.

While I have described various embodiments of my invention for the purpose of illustration, it should be understood that various modifications and adaptations thereof may be made within the spirit of the invention as set forth in the appended claims.

I claim:

1. A quick release pin device which comprises a pin, a radially expansible bushing mounted on said pin, a first member connected to one end of said pin and abutting one end of said bushing, the diameter of said first member being no greater than the diameter of said bushing in expanded position, said bushing at said one end thereof having a surface outwardly inclined from said first member, a radially expansible ring mounted on said inclined surface, a second member slidably mounted on said pin adjacent the other end of said bushing, and means connected to said pin for applying pressure against said second member and against said other end of said bushing, to thereby compress said bushing between said members and cause radial expansion of said bushing and radial expansion of said ring along said inclined surface.

2. A quick release device which comprises a pin, a radially and elastically expansible bushing having an exterior cylindircal surface formed of a plurailty of cooperating rings mounted on said pin, a head connected to one end of said pin and abutting one end of said bushing, a thrust plate slidably mounted on said pin adjacent the other end thereof and in abutting relation with the other end of said bushing, and cam means connected to said other end of said pin for applying pressure by camming action against said thrust plate and against said other end of said bushing, to thereby compress said bushing between said head and said thrust plate, and cause radial expansion of said bushing, said bushing at said one end thereof having a surface outwardly inclined from said head, and a radially expansible ring mounted on and having a contiguous surface mating with said inclined surface, whereby on application of pressure by said cam means against said thrust plate and a consequent compression of said bushing, said ring expands radially along said inclined surface.

3. A quick release pin device which comprises a pin, a radially expansible bushing mounted on said pin, a first member connected to one end of said pin and abutting one end of said bushing, the diameter of said first member being no greater than the diameter of said bushing in expanded position, said bushing at said one end thereof having a surface outwardly inclined from said first member, a radially expansible ring mounted on said inclined surface, a second member slidably mounted on said pin adjacent the other end of said bushing, and means connected to said pin for applying pressure against said second member and aganist said other end of said bushing, to thereby compress said bushing between said members and cause radial expansion of said bushing and radial expansion of said ring along said inclined surface, wherein said radially expansible bushing comprises at least a pair of male and female rings, each of said male rings positioned adjacent to and spaced from each other, said male rings having opposed exterior wedge surfaces, and an intermediate exterior cylindrical surface, said female rings mating with said male rings at opposite ends thereof, said female rings having interior, opposed conical wedge surfaces and an intermediate cylindrical surface, said rings adapted to be freely, angularly, longitudinally and radially positioned about said pin, said rings being slit by a slot extending through the walls of said rings longitudinally of the axis of said rings, said inclined surface at said one end of said bushing being a wedge surface of one of said male rings, and said radially expansible ring mounted on said inclined surface being a segment of one of said female rings having a wedge surface mating with the wedge surface of said last mentioned male ring.

4. A quick release device which comprises a pin, a radially and elastically expansible bushing having an exterior cylindrical surface formed of a plurality of cooperating rings mounted on said pin, a head connected to one end of said pin and abutting one end of said bushing, a thrust plate slidably mounted on said pin adjacent the other end thereof and in abutting relation with the other end of said bushing, and cam means connected to said other end of said pin for applying pressure by camming action against said thrust plate and against said other end of said bushing, to thereby compress said bushing between said head and said thrust plate, and cause radial expansion of said bushing, said bushing at said one end thereof having a surface outwardly inclined from said head, and a radially expansible ring mounted on and having a contiguous surface mating with said inclined surface, whereby on application of pressure by said cam means against said thrust plate and a consequent compression of said bushing, said ring expands radially along said inclined surface, wherein said radially expansible bushing comprises at least a pair of male and female rings, each of said male rings positioned adjacent to and spaced from each other, said male rings having opposed exterior wedge surfaces, and an intermediate exterior cylindrical surface, said female rings mating with said male rings at opposite ends thereof, said female rings having interior, opposed conical wedge surfaces and an intermediate cylindrical surface, said rings adapted to be freely, angularly, longitudinally and radially positioned about said shaft, said rings being slit by a slot extending through the walls of said rings longitudinally of the axis of said rings, said inclined surface at said one end of said bushing being a wedge surface of one of said male rings, and said radially expansible ring mounted on said inclined surface being a segment of one of said female rings having a wedge surface mating with the wedge surface of said last mentioned male ring.

5. A quick release pin device which comprises a pin, a radially expansible bushing mounted on said pin, a first member connected to one end of said pin and abutting one end of said bushing, the diameter of said member being no greater than the diameter of said bushing, said bushing at said one end thereof having a surface outwardly inclined from said first member, a radially expansible ring mounted on said inclined surface, a second member slidably mounted on said pin adjacent the other end of said bushing, said second member having a diameter greater than the diameter of said bushing, and means connected to said pin for applying pressure against said second member and against said other end of said bushing, to thereby compress said bushing between said members and cause radial expansion of said bushing and radial expansion of said ring along said inclined surface to a diameter greater than the diameter of said bushing.

6. A quick release pin which comprises a pin, a bushing mounted on said pin, said bushing having a cylindrical outer surface and being elastically expansible, a first member connected to one end of said pin, said member having a diameter greater than the diameter of said pin, a second member slidably mounted on said pin adjacent the other end thereof, said bushing including and said bushing having an inclined surface at one end adjacent said first member, a radially and elastically expansible ring member having a cylindrical outer surface and a conical interior surface positioned on said inclined surface and in contact with said first member, and means for applying pressure against said second member, and causing said expansible member to expand radially.

7. A releasable fastener comprising a shaft, a radially and elastically expansible bushing mounted on said shaft, said bushing including an elastically and radially expansible female ring having an annular wedge surface on the interior of said ring, a first member mounted on said shaft adjacent one end of said bushing, the diameter of said first member being no greater than the diameter of said bushing in the fully expanded position, and a second member axially displaceable on said shaft, and mounted on said shaft adjacent the other end of said bushing, and means on said shaft for applying an axial compressive force between said first member and the other end of said bushing to thereby compress said bushing axially, said means including a member having a male wedge surface mating with said wedge surface of said female ring whereby said axial compressive force causes an axial displacement of said female ring relative to said male wedge surface and an elastic and radial expansion of said female ring along said wedge surfaces, wherein said radially expansible bushing comprises at least a pair of male and female rings, each of said male rings positioned adjacent to and spaced from each other, said male rings having opposed exterior conical wedge surfaces, and an intermediate exterior cylindrical surface, said female rings mating with said male rings at opposite ends thereof, said female rings having interior, opposed conical wedge surfaces and an intermediate cylindrical surface, said rings adapted to be freely, angularly, longitudinally and radially positioned about said shaft, said rings being slit by a slot extending through the walls of said rings longitudinally of the axis of said rings, said inclined surface at said one end of said bushing being a wedge surface of one of said male rings, and said radially expansible female ring mounted on said member having a male wedge surface, being one of said female rings having a wedge surface mating with the wedge surface of said last-mentioned male ring, and said last-named member being one of said male rings.

References Cited by the Examiner

UNITED STATES PATENTS

| 408,364 | 8/89 | Traut. | |
| 1,120,368 | 12/14 | Booraem et al. | 85—2.8 |
| 1,120,408 | 12/14 | Rohmer et al. | 85—2.8 |
| 2,282,711 | 5/42 | Eklund | 85—2.4 X |
| 2,573,928 | 11/51 | Peter | 279—2 |

CHARLES E. O'CONNELL, Primary Examiner.

RICHARD W. COOKE, JR., JACOB L. NACKENOFF, CORNELIUS D. ANGEL, Examiners.